United States Patent
Lascombes et al.

(10) Patent No.: US 9,230,444 B2
(45) Date of Patent: Jan. 5, 2016

(54) METHOD AND SYSTEM FOR ASSISTING THE PILOTING OF AN AIRCRAFT IN LANDING PHASE

(71) Applicants: Airbus Operations (SAS), Toulouse (FR); Airbus SAS, Blagnac (FR)

(72) Inventors: Jean-Michel Lascombes, Toulouse (FR); Jerome Journade, Tournefeuille (FR); Remi Morin, Plaisance du Touch (FR); Robert Lignee, Tournefeuille (FR)

(73) Assignees: AIRBUS OPERATION (SAS), Toulouse (FR); AIRBUS SAS, Tournefeuille (FR)

( * ) Notice: Subject to any disclaimer, the term of this patent is extended or adjusted under 35 U.S.C. 154(b) by 0 days.

(21) Appl. No.: 14/296,991

(22) Filed: Jun. 5, 2014

(65) Prior Publication Data

US 2014/0371958 A1 Dec. 18, 2014

(30) Foreign Application Priority Data

Jun. 13, 2013 (FR) ..................................... 13 55499

(51) Int. Cl.
- *G06F 19/00* (2011.01)
- *G08G 5/02* (2006.01)
- *B60T 8/17* (2006.01)
- *B64C 25/42* (2006.01)
- *G08G 5/06* (2006.01)

(52) U.S. Cl.
CPC ................ *G08G 5/02* (2013.01); *B60T 8/1703* (2013.01); *B64C 25/426* (2013.01); *G08G 5/065* (2013.01)

(58) Field of Classification Search
CPC ........ B60T 8/00; B60T 8/1703; G08G 5/0086
See application file for complete search history.

(56) References Cited

U.S. PATENT DOCUMENTS

| | | | |
|---|---|---|---|
| 2008/0030073 A1 | 2/2008 | Goodman et al. | |
| 2009/0292433 A1 | 11/2009 | Goodman et al. | |
| 2009/0292483 A1* | 11/2009 | Journade et al. | ................ 702/33 |
| 2010/0079308 A1 | 4/2010 | Fabre et al. | |
| 2011/0166723 A1 | 7/2011 | Velntova et al. | |

FOREIGN PATENT DOCUMENTS

| | | |
|---|---|---|
| FR | 2930669 | 10/2009 |
| FR | 2936078 | 3/2010 |
| FR | 2936079 | 3/2010 |

OTHER PUBLICATIONS

French Search Report, Feb. 11, 2014.

* cited by examiner

*Primary Examiner* — Michael D Lang
(74) *Attorney, Agent, or Firm* — Greer, Burns & Crain, Ltd.

(57) ABSTRACT

A method and system for determining local information which is dependent on a local runway state when the aircraft is in movement on the runway in order to update, in real-time, or practically in real-time, data used by a braking assistance system, according to whether the local runway state associated with the determined local information indicates a runway deterioration relative to a reference runway state used initially.

12 Claims, 3 Drawing Sheets

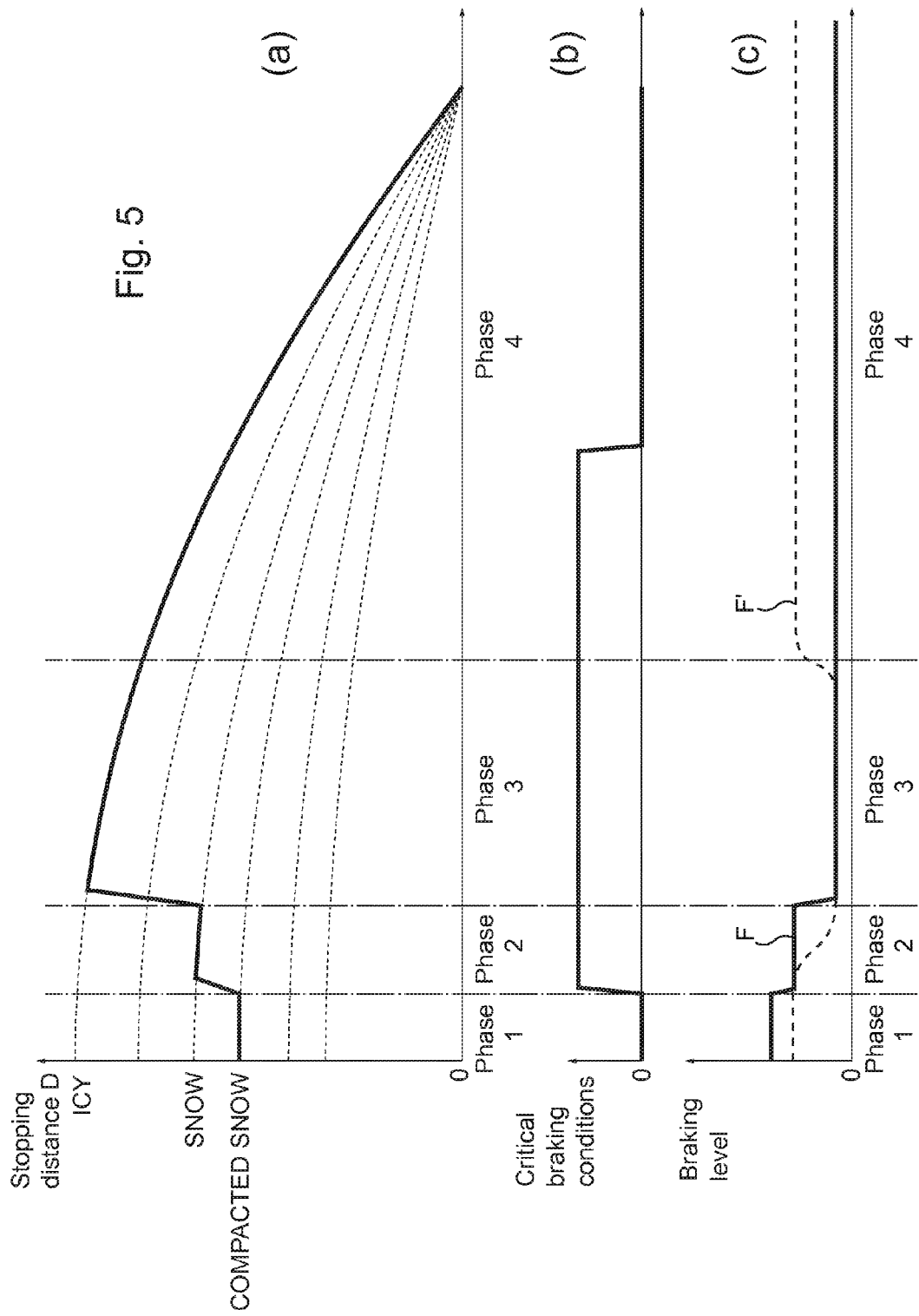

METHOD AND SYSTEM FOR ASSISTING THE PILOTING OF AN AIRCRAFT IN LANDING PHASE

CROSS-REFERENCES TO RELATED APPLICATIONS

This application claims the benefit of the French patent application No. 1355499 filed on Jun. 13, 2013, the entire disclosures of which are incorporated herein by way of reference.

BACKGROUND OF THE INVENTION

The present invention relates to a method and a system for assisting the piloting of an aircraft, and to an aircraft equipped with such a system.

During the phases of take-off and landing, and more generally of movement on the ground of the aircraft, knowledge of the surface state of the runway is of capital importance.

Indeed, prediction of braking performance of the aircraft depends on that knowledge. It is thus possible:

to estimate as best possible the distance required to stop the aircraft at the time of its landing, in the interest of safety, not to overestimate that stopping distance required to immobilize the aircraft and thus not to excessively penalize the operations of use of the runway and of the aircraft.

Numerous assistance systems for piloting require precise knowledge of this runway state.

For example, documents FR2817979 and FR2857468 propose devices for assisting piloting during the approach and landing phases, known under the name Brake-To-Vacate (BTV), making it possible to monitor and control the braking of the aircraft via closed loop control laws. These control laws directly depend on the estimation of stopping distances based on the runway state.

Furthermore, documents FR2936077 and FR2914097 provide devices for assisting piloting during the approach and landing phases, known under the name Runway Overrun Protection (ROP) or Runway Overrun Warning (ROW), enabling detection of an overrun risk on the basis of the runway state, in order to warn the pilot either so as to incite him to perform a go-around, or to apply maximum braking.

However, the braking performance of an aircraft on a contaminated runway and thus the required stopping distance are difficult to predict on account of the difficulty of reliably and precisely knowing the runway state, which is decisive in the deceleration of the aircraft.

Conventionally, the runway state is determined by staff on the ground, or evaluated by a pilot on landing and entered in a landing report. This runway state information, sent to the aircraft in approach phase, is however of low reliability and may become rapidly out of date. To be precise, the runway state characteristics are highly volatile over time.

In order to render more reliable the estimation of a runway state, documents FR2930669 and FR2978736 provide solutions enabling the runway state for landing to be automatically estimated on the basis of measured landing performances of an aircraft on landing, this being independently of the aircraft type.

However, the runway state so determined and provided to the aircraft on approach phase does not enable such a possible runway degradation occurring between the two landings to be shown.

The present invention is directed to improving the assistance for piloting an aircraft in particular during the landing phase to take into account that possible runway degradation.

SUMMARY OF THE INVENTION

To that end the invention is in particular directed to a method for assisting the piloting of an aircraft in landing phase, comprising a step of generating a braking data item, typically a stopping distance prediction, on the basis of a reference runway state, said braking data item being supplied as an input for a braking assistance module, the method being characterized by the following steps:

determining a local information item which is dependent on a runway state local to the aircraft on landing; and updating the reference runway state or the braking data item on the basis of the determined local information item, when the local information item indicates a local runway state that is more degraded that the reference runway state, so as to provide an updated braking data item as input for the braking assistance module.

In a complementary manner, the invention is also directed to an assistance system for piloting an aircraft in landing phase, comprising:

a module for generating a braking data item on the basis of a reference runway state;

a braking assistance module receiving said generated braking data item as input;

a determining module for determining a local information item which is dependent on a runway state local to the aircraft on landing; and an updating module for updating the reference runway state or the braking data item on the basis of the determined local information item, when the local information item indicates a local runway state that is more degraded that the reference runway state, so as to provide an updated braking data item as input for the braking assistance module.

Thus, a data item relative to the runway state is updated during the landing phase, which makes it possible to take note of a possible degradation of the runway having occurring since the determination of the reference runway state, for example by the aircraft having landed previously, and to control the aircraft accordingly.

To that end, in addition to the obtaining of the reference runway state by the assistance system for piloting as in the prior art, another information item that is dependent on the runway state local to the aircraft on landing is determined for the purpose of deducing therefrom a possible degradation of the runway relative to the reference runway state used to control the braking. This local runway state characterizes the runway zone upon which the aircraft is moving on the ground during the landing.

When the local information item reveals a degradation of the runway state relative to the reference runway state, data used by the system to control the braking are updated in real time during the landing, in particular either the reference runway state, or a braking data item internal to the system, which makes it possible to adjust the braking of the aircraft in keeping with the degradation suffered by the runway.

The braking performance and thus the safety of the aircraft on landing are thereby improved.

The assistance system for piloting has similar advantages to the method according to the invention. Other features of the method and system for assisting piloting according to various embodiments are described in the dependent claims.

In a particular embodiment, the method comprises a step of reconfiguring a braking assistance system of the aircraft, manipulating the reference runway state or the braking data item, on the basis of the updated braking data item or reference runway state.

In a first embodiment of the invention, the local information item represents a current level of braking or deceleration of said aircraft, and the method comprises a step of obtaining an information item, referred to as reference information item, representing a level of braking or deceleration of said aircraft deduced from the reference runway state or from the braking data item, and a step of comparing the reference information item with the local information item to determine whether the local runway state is more degraded that the reference runway state. This reference information item may correspond to an estimation of a level of braking or theoretical deceleration computed by the system on the basis of the reference runway state.

In similar manner, the local information item may correspond to an actual value of a level of braking or deceleration of the aircraft, for example measured by on-board sensors.

In a second embodiment of the invention, the local information item is an estimation of the local runway state by an on-board system in the aircraft, and the updating step updates the reference runway state with the estimated local runway state.

In particular, in this second embodiment, the estimation of the local runway state may be deduced from measurements by sensors.

In a particular embodiment of the invention, the updating step is carried out when at least one of the following critical conditions is encountered: the difference between a deceleration set-point value of the aircraft to apply and a value of deceleration measured by the aircraft exceeds a predetermined threshold; the level of manual depression of a brake pedal by an operator exceeds a predetermined threshold; the difference between a level of braking commanded by the aircraft and a level of braking measured in the aircraft exceeds a predetermined threshold; an anti-skid system of the aircraft is triggered.

In a complementary manner, the aforementioned system may comprise a module for determining whether at least one of the following critical conditions is encountered in order to trigger updating by the updating module: the difference between a deceleration set-point value of the aircraft to apply and a value of deceleration measured by the aircraft exceeds a predetermined threshold; the level of manual depression of a brake pedal by an operator exceeds a predetermined threshold; the difference between a commanded level of braking of the aircraft and a level of braking measured in the aircraft exceeds a predetermined threshold; an anti-skid system of the aircraft is triggered.

The assistance system for piloting thus computes braking instructions adapted in real time to the real landing conditions, thus improving landing safety.

In a particular embodiment of the invention when a reference information item is the reference runway state, the updating step comprises replacing the reference information item by the local information item.

For example, the reference runway state is received from an aircraft having previously landed or from a station on the ground, and the updating makes it possible to replace that reference runway state with a local runway state determined by an on-board system of the aircraft, more representative of the real conditions of the runway.

The system may then compute a new braking instruction or warning on the basis of the reference information item (runway state) so updated. This new braking instruction or warning is then better adapted to the real conditions of the runway.

In another specific embodiment of the invention, the updating step comprises computing a correction coefficient dependent on the determined local information item and the braking data item correction, typically a stopping distance prediction used for computing the braking instruction or warning, on the basis of the computed correction coefficient.

In another specific embodiment of the invention, the braking data item is a minimum stopping distance dependent on the reference runway state, and the updating step comprises correcting the minimum stopping distance based on the determined local information item, by interpolating several minimum stopping distances respectively associated with theoretical runway states.

In particular, the determined local information item may represent a current level of braking or deceleration of said aircraft, and correcting the minimum stopping distance based on the determined local information item may then comprise interpolating minimum stopping distances associated with theoretical deceleration or braking distances on the basis of the current determined level of braking or deceleration.

The invention is also is directed to an aircraft comprising at least one assistance system for piloting as defined above. It is thus adapted to implement the aforementioned method for assisting piloting.

BRIEF DESCRIPTION OF THE DRAWINGS

Still other particularities and advantages of the invention will appear in the following description, illustrated by the accompanying drawings, in which:

FIG. 5 illustrates an operational scenario for a landing during which the invention is used.

DETAILED DESCRIPTION OF THE PREFERRED EMBODIMENTS

Figure 1:
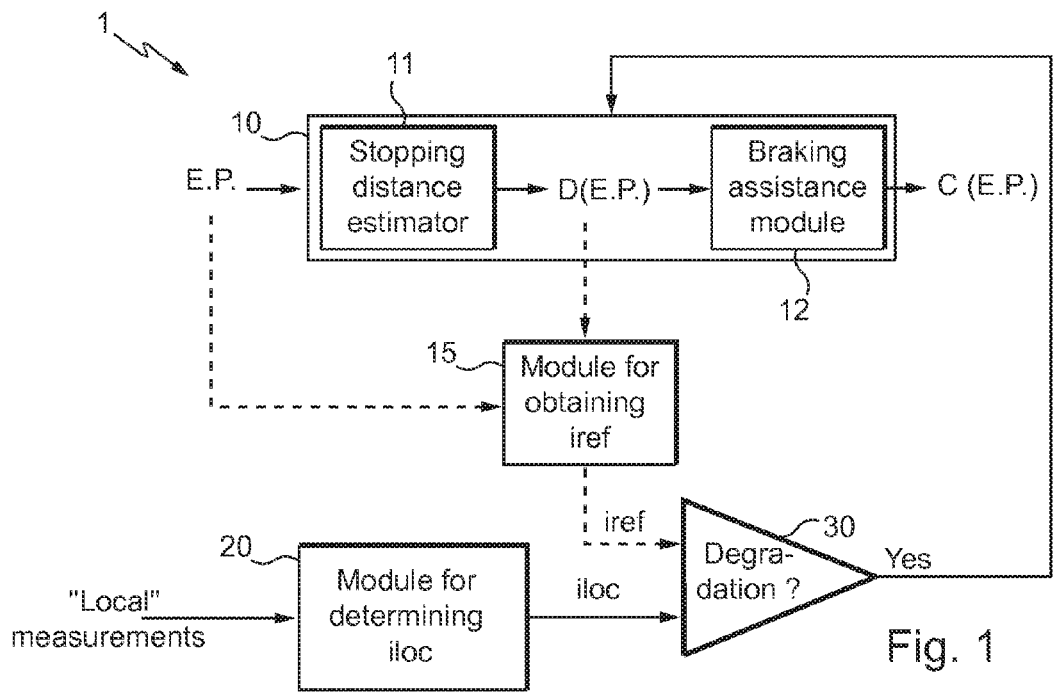
FIG. 1 illustrates an assistance system for piloting an aircraft, in accordance with particular embodiments.

FIG. 1 is a diagrammatic representation of an assistance system 1 for piloting an aircraft, in accordance with a particular embodiment of the invention.

The system 1 comprises a braking assistance system 10 which, based on a reference runway state EP, for example received from an aircraft having previously landed or from a station on the ground, generates a braking instruction C(EP) supplied as input to a braking device of the aircraft or generates a warning message C(EP) supplied as input to an advising device of the aircraft. It is to be noted that the warning message may be a message of non-warning, at the start of landing.

The braking assistance system 10 comprises a module 11 for generating a braking data item on the basis of the reference runway state EP and comprises a braking assistance module 12 configured to generate the instruction C(EP) on the basis of the braking data item generated.

In the example of the Figure, braking data item generating module 11 is a stopping distance estimator configured to estimate a stopping distance prediction D(EP) of the aircraft on the basis of the reference runway state EP, and possibly other parameters of the aircraft (such as its speed, its weight, its braking capacities, etc.).

The runway state EP is generally based on models provided by rules, for example the following states by increasing order of degradation: DRY (for dry runway), WET (for wet runway), COMPACTED SNOW, WATER or SLUSH (for runways contaminated by stagnant water or melted snow) and ICY (for ice).

The braking assistance system 10 may for example be a Brake-To-Vacate (BTV) type device as described in documents FR2817979 and FR2857468 enabling the pilot to control the braking of the aircraft on the basis of a theoretical stopping distance associated with the reference runway state EP. The braking instruction C(EP) generated by the BTV device thus controls a braking device, for example brakes.

This braking instruction C(EP) may for example represent a braking control imposing a certain deceleration corresponding to the stopping distance prediction D(EP) for the aircraft.

As a variant, the braking assistance system 10 may be a device for warning and management of the risks of leaving the runway of Runway Overrun Protection (ROP) type as described for example in the documents FR2936077 and FR2914097.

The ROP device adjusts the stopping distance prediction output from the stopping distance estimator on the basis of the input reference runway state, and subsequently, if certain conditions are met (for example if the stopping distance prediction brings the aircraft close to the end of the runway or outside it), may emit warnings and/or braking commands.

These warnings may consist of visual or audio messages displayed or played in the aircraft cockpit, intended for the crew. A braking order may be an automatic maximum braking order (full pressure) for the braking device.

The system 1 also comprises a determining module 20 for determining a local information item iloc dependent on a local runway state of the aircraft, that is to say the state of the runway on which the aircraft moves during landing. This determining is for example carried out based on measurements referred to as local in the sense that at least one physical quantity of the aircraft is measured during the landing at the time the aircraft travels on the part of the runway considered as "local."

For this, the aircraft is equipped with ad hoc sensors which are for example situated at each wheel to determine for example the vertical load which is applied to them and/or the braking torque applied by the braking system, and such as the rotational speed of the wheels during landing.

The aircraft may also comprise one or more ADIRS inertial centers (ADIRS standing for "Air Data Inertial Reference System") enabling measurements to be obtained of speed of the aircraft on the ground, position, acceleration and temperature, an FMS (FMS standing for Flight Management System), equipment for estimating physical quantities for the tires (temperature and internal pressure), as well as a GPS module providing the position of the aircraft.

Another physical quantity that can be measured is the level of depression of the brake pedals by the pilot or a braking pressure.

In general terms, numerous data items may be supplied and used in order to determine the local information item iloc. By way of illustration, module 20 receives the location of the center of gravity CG of the aircraft, the slope of the runway, the outside temperature, wind data (strength and direction), speeds (ground speed, true calibrated air speed, speed of the wheels), altitude data (pressure, etc.), the mass of the aircraft, airport data, data on the runway used in particular the GPS coordinates of the runway, GPS position data of the aircraft, engine running parameters, brake pedal depression information, states of movable surfaces (such as lift-increasing devices, the elevator, the air brakes, the ailerons), measurement information relative to the tires (temperature and internal pressure), Boolean information representing for example the touch-down of the main landing gear on the runway and the opening of the thrust reverser doors, etc.

It may be noted that all or some of this data, mainly that concerning dynamic data of the aircraft or outside conditions for example, capable of being updated depending on the weather in particular during the aircraft's movement on the ground: speeds, engine thrust levels, wind, tire temperature and pressure, etc. The measured data may then be time-stamped in order to facilitate the bringing together of certain measurements with the speed of the aircraft on the ground at the same time and/or the runway zone (position of the aircraft) on which the aircraft is moving at the same time.

These measurements carried out by the various sensors are sent to the determining module 20 which then computes said local information item iloc based thereon.

According to one embodiment, the local information item iloc is directly the local runway state EPloc estimated by an on-board system for the aircraft based on the aforementioned measurements.

As a variant, the local information item iloc is a current deceleration or braking level of the aircraft, for example the current value of its deceleration.

By way of example, the methods and systems of applications FR2930669 and FR2978736 may be used for implementing the determining module 20. These methods and systems in particular evaluate the braking or deceleration performances of the aircraft to estimate a current runway state.

For example, the balance of the forces makes it possible to obtain the braking force Fb of the aircraft by the following formula: $m \cdot a = T - Daero - Fb - Dcont - m \cdot \sin \gamma$, where m is the mass of the aircraft, a the acceleration (or deceleration), T the engine thrust (for example obtained by the position of the throttle lever and from engine parameters such as the engine speed), Daero, the aerodynamic drag (for example obtained by modeling based on various parameters, for example the angle of incidence, the pitch attitude, an airbrake extension information item), Dcont is the drag resulting from contamination of the runway (for example based on a runway profile corresponding to the runway state EP) and $\gamma$ is the slope of the runway.

The system 1 further comprises a comparator 30 and a feedback loop from that comparator to the braking assistance module 10 for the purposes of implementing the invention.

The comparator 30 enables the local information item iloc obtained by module 20 to be compared with a reference information item iref of the same nature that is dependent on the runway state referred EP. This reference information item iref is obtained from a module 15 for obtaining such an information item, which receives as input the runway state EP and/or the braking data item, for example the stopping distance prediction D(EP).

According to one embodiment, the module 15 for obtaining iref selects the runway state EP as input for the braking assistance system 10 as reference information item iref. In this case, the local information item iloc is the local runway state EPloc estimated by an on-board system, in order for a comparison to be possible.

As a variant, the module 15 for obtaining iref determines a quantity dependent on EP such as an information item representing a level of braking or deceleration of the aircraft, denoted F. This is for example the deceleration that can theoretically be attained by the aircraft (within the limits of adherence/friction with the runway) on the runway state EP. In this case, the local information item iloc is a current level of braking or deceleration of the aircraft, in order for a comparison to be possible.

According to the invention, the comparison by the comparator 30 aims to determine a possible degradation of the local runway state relative to the reference runway state. In other words, it is a matter of testing whether the local runway state upon which depends the local information item iloc is more degraded than the reference runway state upon which depends the reference information item iref.

When the result of the comparison shows that the runway state has not degraded since the previous landing, the braking assistance system 10 possesses data (runway state EP and stopping distance D(EP)) which ensure effective braking. Thus, none of these system data 10 is updated, such that the braking instruction or the warning C(EP) generated initially by the braking assistance system 10 on the basis of the reference runway state is kept.

On the contrary, when the result of the comparison shows that the runway state has degraded, the data of the braking assistance system 10 have expired and no longer ensure braking safety. The invention then provides that the reference runway state EP or the stopping distance prediction D(EP), depending on the case, is updated on the basis of the determined local information item (iloc), in the braking assistance system 10, in order to adapt the braking for the landing to the real runway conditions in real time. As a matter of fact, this updating makes it possible to supply an updated braking data item (D(EP)) of the braking assistance module 12, in order also to update the warning or braking instruction C(EP).

According to different embodiments, this updating may be carried out either by updating the runway state as input to the braking assistance system 10, or by modifying the braking data item D(EP) output from the stopping distance estimator 11 or input to module 12.

Thus, the assistance system for piloting according to the invention comprises:

a module 11 for generating a braking data item D(EP) on the basis of a reference runway state (EP);

a braking assistance module 12 receiving said generated braking data item as input;

a determining module 20 for determining a local information item iloc which is dependent on a runway state (EPloc) local to the aircraft on landing; and an updating module (10, 30) for updating the reference runway state EP or the braking data item D(EP) on the basis of the determined local information item iloc, when the local information item iloc indicates a local runway state EPloc that is more degraded that the reference runway state EP, so as to provide an updated braking data item D(EP) as input for the braking assistance module.

Such a system for assisting piloting may be integrated in a single computer, or else, as a variant, its various functions may be distributed between several computers communicating together in order for example to re-use existing computers.

Figure 2:
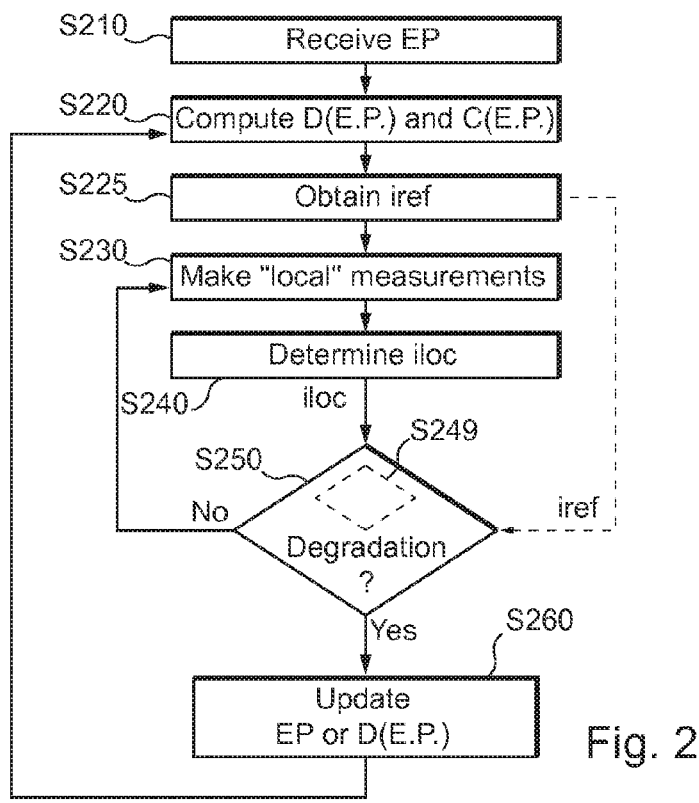
FIG. 2 is a flowchart representation of the main steps of a method for assisting the piloting of an aircraft according to the invention.

FIG. 2 is a flowchart representation of the main steps of a method for assisting the piloting according to a specific embodiment of the invention. This method may be implemented in an assistance system for piloting according to the invention, for example such as described with reference to FIG. 1.

During a step S210, a theoretical runway state or reference EP is received by the aircraft, for example from an aircraft having previously landed or from a station on the ground.

For example, this reference runway state EP may be the fruit of a synthesis of several runway states obtained at the time of previous landings of several aircraft, this synthesis being carried out by the aforementioned station on the ground.

Next, during a step S220, the braking assistance system 10 generates a braking instruction or a warning message C(EP) on the basis of that reference runway state EP. This step comprises estimating the stopping distance prediction D(EP) by the estimator 11 as referred to previously.

The braking instruction C(EP) may be of a different nature. It may in particular be a matter of applying a certain value of braking force, a depression level of the brake pedals, a deceleration level to attain, a stopping distance to attain or for instance a braking pressure. For example, the deceleration level to attain may be computed as a level of braking that is operationally acceptable for the aircraft given the reference runway state EP. As a variant, it may be the level of deceleration attained by the aircraft in critical braking condition.

The same applies for the stopping distance to attain: an operationally acceptable stopping distance or, as a variant, a minimum stopping distance that is possible for the aircraft in critical braking condition.

The braking conditions are said to be critical when the aircraft attains a braking level limited by the friction of the runway or the adherence of the runway.

The warning message may be a vocal or visual message intended for the pilot who supplied the braking instructions to apply.

At step S225, the obtaining module 15 supplies a reference information item iref to the comparator 30. As previously noted this may be the runway state EP input to the braking assistance system 10 or an information item representing a critical level of braking or deceleration F deduced from the reference runway state EP or from the braking data item, here the stopping distance prediction D. It is to be noted that this information item representing a level of braking or deceleration may have already been computed by the braking assistance system 10 at step S220, in which case it is recovered directly.

Local measurements are carried out during a step S230 in order to determine (step S240) a local information item iloc characterizing the local runway state EPloc or the current level of braking or deceleration F' of the aircraft on landing (iloc and iref are of the same nature).

A current deceleration level may, for example be obtained directly from an accelerometer. Furthermore, a local runway state may be obtained by implementing the mechanisms from the aforementioned documents FR2930669 and FR2978736.

The method continues at step S250 in which a test consists of comparing the local information item iloc determined during step S240 to the reference information item iref of the same nature obtained at step S225: either the reference runway state EP received at step S210 in the case in which the local information item iloc corresponds to the runway state EPloc local to the aircraft, or to the information representing a level of braking or deceleration F determined at step S225, where the local information item iloc corresponds to the same current level of braking or deceleration F'.

The objective of the test S250 is to determine whether the local information item iloc characterizing the zone on which the aircraft is in course of landing represents or indicates a runway state that has degraded relative to the theoretical or reference runway state EP upon which depends the reference information item iref.

It is to be noted that the execution of test S250 may be dependent upon determining (S249) whether the aircraft encounters a critical braking condition.

For example, the critical level of braking or deceleration F (for example deceleration that can theoretically be attained within the limits of adherence of the runway) as obtained at step S225 represents a peak level of braking to attain (maximum deceleration, minimum stopping distance, etc.), that is to say obtained in critical braking condition of the aircraft. It therefore makes no sense, in this case, to compare this theoretically attainable deceleration with the current braking level of the aircraft it the latter is not in critical braking situation.

By way of illustration, the critical conditions for braking resulting from braking limited by the friction of the runway are encountered when the difference between a deceleration set-point braking value of the aircraft to apply and a deceleration value measured by the braking exceeds a predetermined threshold; the level of manual depression of a brake pedal by an operator (the pilot for example) exceeds a predetermined threshold; the difference between a commanded braking level of the aircraft and a level of braking measured in the aircraft exceeds a predetermined threshold, or for instance an anti-skid system of the aircraft has yet to be triggered.

Another example in which the condition S249 is implemented is that employing the mechanisms of the above-mentioned publication FR2930669 on determination of a local runway state iloc at step S240, since that determination is only carried out in presence of critical braking conditions of the aircraft.

It is to be noted that as the information iref is only used at step S250, step S225 may be carried out at any time in the method between steps S210 and S250, independently of steps S230, S240 and S249 in particular. For example, step S225 may be carried out later than the verification of condition S249 in order to avoid a needless computation of the theoretically attainable deceleration.

When test S250 shows that the runway state has not degraded, the method loops back to step S230. Here, the data used by the system 10 as well as the braking instruction or warning C(EP) are not updated. The aircraft thus keeps the same braking instruction or warning since the runway has not further degraded.

When the test S250 shows that the runway state has degraded relative to the reference runway state, the reference runway state EP or the stopping distance prediction D(EP), according to the case, is updated during a step S260 in order to take into account the degradation of the runway that has occurred since the preceding landing and thus establish a satisfactory level of braking safety for the landing. Next the method loops back to step S220 to generate a new braking instruction or a warning message C(EP) based on the updated stopping distance prediction (possibly via the updating of EP).

This looping back enables dynamic updating in real time, or practically in real-time, of the instruction or the warning during the landing.

Figure 3:
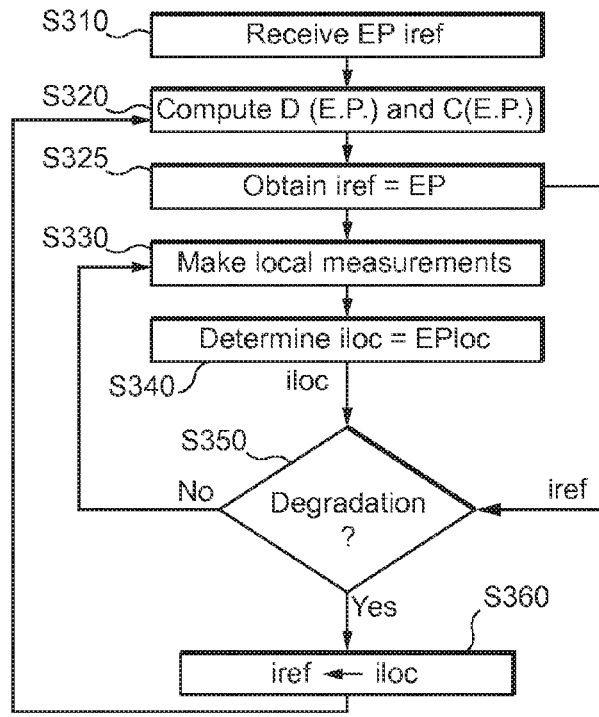
FIGS. 3, 4a and 4b are flowchart representations of the steps of methods for assisting the piloting of an aircraft in accordance with three embodiments of the invention.

FIG. 3 represents the steps of a method for assisting the piloting of an aircraft, according to a first embodiment.

This method may be implemented in a system according to the invention, for example such as described with reference to FIG. 1.

During a step S310, similar to step S210 described with reference to FIG. 2, the aircraft receives a reference runway state EP.

During a step S320, similar to step S220 described with reference to FIG. 2, the assistance system for piloting 10 estimates a stopping distance prediction D(EP) based on EP and generates a braking instruction or a warning message C(EP) based on D(EP).

Step S325 consists of choosing the reference runway state EP as reference information item iref. Thus, in this embodiment iref=EP as supplied as input to the comparator 30 for the test S350.

Local measurements are then made during a step S330, as described with reference to FIG. 1 and in similar manner to step S230 of FIG. 2.

During a step S340, a local runway state EPloc which constitutes the local information item iloc according to the invention is deduced from the measurements made at step S330. Reference may be made for example to documents FR2930669 and FR2978736.

During a test step S350 (which may possibly be subjected a condition S349 similar to S249), the comparator 30 compares the local information item iloc=EPloc to the reference information item iref=EP to determine whether the runway state has degraded.

If the two runway states are equal, for example EP=EPloc=WET (wet runway), or if the local runway state, for example EPloc=DRY (dry runway) is less degraded than the reference runway state, for example EP=WET (wet runway), the data used by the braking assistance system 10 are not modified, and thus the braking instruction or warning C(EP) is also not modified. Steps S330 and subsequent steps are then reiterated (looping back to S330).

If, on the contrary, the local runway state, for example EPloc=ICY (icy runway), proves to be more degraded than the reference runway state, for example EP=WET (wet runway), the reference runway state EP (here the reference information item iref) is replaced by the local information item iloc=EPloc as input to the braking assistance system 10 during an updating step S360. Next, the method loops back to step S320 to once again estimate D(EP) and generate a new braking instruction or warning C(EP) based on the new updated reference state, in the example after updating EP=iloc=ICY (icy runway).

The braking assistance system 10 is thus reconfigured on the basis of the local runway state determined at step S340.

In a variant of the embodiment of FIG. 3, the updating step S350 is dependent upon the determination of whether the aircraft encounters a critical braking condition in similar manner to step S249 described with reference to FIG. 2. This is the case for example if step S340 implements the mechanisms described in the publication FR2930669.

Figure 4A:
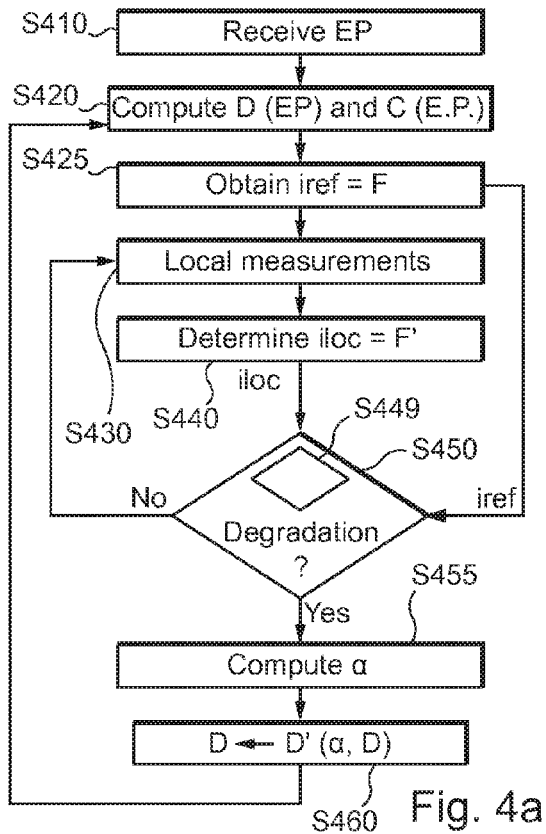

FIG. 4a represents the steps of a method for assisting the piloting of an aircraft, according to a second embodiment.

This method may be implemented in a system according to the invention, for example such as described with reference to FIG. 1.

During a step S410, similar to step S210 of FIG. 2 and to step S310 of FIG. 3, the aircraft receives a reference runway state EP.

During a step S420, similar to step S220 of FIG. 2 and to step S320 of FIG. 3, the system 10 for assisting piloting estimates a stopping distance prediction D(EP) based on EP and generates a braking instruction or a warning message C(EP) based on D(EP).

The braking instruction corresponds for example to the value or level of braking or deceleration operationally acceptable given the reference runway state EP.

During a step S425, the module 15 for obtaining iref determines an information item representing a critical (or theoretically attainable) level of braking or deceleration F of said aircraft deduced from the reference runway state EP or from the stopping distance prediction D when the latter is updated as described below. iref may in particular take the value of the instruction C(EP) if the latter actually represents a level of braking or deceleration.

Local measurements are made during a step S430, in similar manner to step S230 of FIG. 2 and to step S330 of FIG. 3.

During a step S440, the current (or actual) level of braking or deceleration F' of the aircraft is deduced from local measurements made at step S430, this current braking level F' then constituting the local information item iloc representing the local runway state.

The following step S450 is dependent upon the determination S449 of whether the aircraft encounters a critical braking condition in similar manner to step S249 described with reference to FIG. 2.

When a critical braking condition is encountered by the aircraft, the test step S450 consists of comparing, by the comparator 30, the local information item iloc=F' to the reference information item iref=F, that is to say the level of braking or deceleration theoretically attainable and the current (or actual) level of braking or deceleration, in order to determine whether the runway state has degraded.

If both levels of braking or deceleration are equivalent, that is to say if F'=F±ΔF where ΔF is a tolerance margin, or if the current level of braking or deceleration is greater than the theoretically attainable level of braking or deceleration, that is to say F'>F, then this means that the runway state has not degraded or that it has improved since determining the reference runway state EP, for example at the time of the previous landing.

In both these cases, the braking assistance system 10 is not reconfigured and the step S430 and the following steps are then reiterated (looping back to S430).

If, on the contrary, while the aircraft is in critical braking condition, the current level of braking or deceleration F' is less than the theoretically attainable level of braking or deceleration F, that is to say if F'<F−ΔF, this means that the runway state has degraded relative to the reference runway state EP.

According to this embodiment of the invention, the stopping distance prediction to attain D(EP) is then updated to take into account that degradation (in reality, D(EP) increases). For this, a correction coefficient α(iloc) is computed during a step S455 based on iloc.

For example, the correction coefficient may be a predefined value of x % (x>100). As a variant, the ratio between the theoretically attainable level of braking or deceleration F and the current level of braking or deceleration F' is used as a correction coefficient: α(iloc)=F/F'.

Next, during a step S460, the stopping distance D(EP) computed during step S420 is corrected by the correction coefficient α computed at step S455: D'(α(iloc); D), for example D'=αD.

The method then loops back to step S420 to generate a new braking instruction C'(D') based on the corrected stopping distance D'(α(iloc); D). It is to be noted that the new iteration of step S425 will then determine iref=F based on that new corrected stopping distance D'(α(iloc); D), and not EP which is not directly updated in this embodiment (corrected D' implicitly indicates a modification of EP).

Figure 4B:
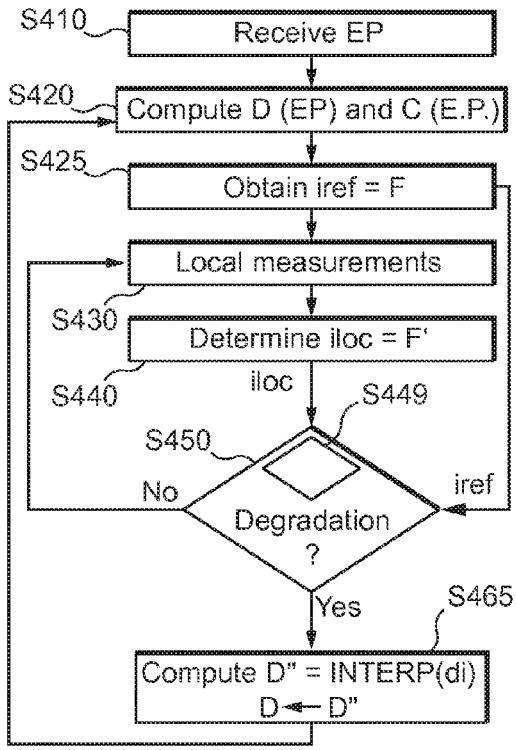

FIG. 4b represents the steps of a method for assisting the piloting of an aircraft, according to a variant of the second embodiment of the invention described with reference to FIG. 4a.

This embodiment differs from FIG. 4a in that, when a degradation of the runway is detected while the aircraft is encountering critical braking conditions (by virtue of tests S449 and S450) and the stopping distance prediction D(EP) to attain must therefore be updated, instead of computing a correction coefficient α (step S455) and correcting (steps S460) that stopping distance D(EP) with that correction coefficient α, a new stopping distance D" is computed by interpolation during a step S465.

A new braking instruction C"(D") is then computed during a new step S420 based on that new stopping distance D" as described above for the new iteration of step S420 of FIG. 4a.

More precisely, the new stopping distance D" is computed by interpolating several minimum stopping distances di representing theoretical runway states with which respective theoretical levels of braking or deceleration are associated.

By way of non-limiting example, a look-up table of matches between those theoretical levels of braking or deceleration fi and those theoretical stopping distances di (for example associated with each possible theoretical runway state) may be used.

Thus, when the current or actual level of braking or deceleration F' is situated between the theoretical levels of braking or deceleration fi and fi+1 respectively corresponding to the stopping distances di and di+1, the new stopping distance D" is computed by applying an interpolation function INTERP to those theoretical stopping distances: D"=INTERP(di; di+1), for example by linear interpolation.

For example, if the current level of braking or deceleration is situated at z % of the level of braking or deceleration associated with the distance di and at (100−z) % of the level of braking or deceleration associated with the distance di+1, then the stopping distance D" may be obtained by the formula: D"=z %*di+(100−z) %*di+1.

FIG. 5 is a graphical illustration of the change in the stopping distance and the braking level in an operational landing scenario using the invention. This scenario may in particular implement the embodiment of FIG. 3 in which the method for assisting piloting relies on the comparison of the reference runway state EP with an estimated local runway state EPloc.

In this scenario, an aircraft equipped with an assistance system for piloting according to the invention, for example such as that described with reference to FIG. 1, is approaching a runway which is theoretically covered with snow (EP=COMPACTED SNOW).

The braking assistance system 10 takes into account this runway state EP and computes a braking instruction or warning C(EP=COMPACTED SNOW) implemented by a braking or advising device once on the ground in course of a phase 1. This braking instruction or warning applies over a stopping distance D(EP=COMPACTED SNOW).

During phase 1, the real or local runway state estimated at step S340 is more degraded than stated by the information item iref, of SNOW type for example. However, the critical braking conditions are not detected at the time of the test S249. The updating S260/S360 of the runway state EP or of the distance D(EP), and therefore of the instruction for braking or deceleration or warning C(EP), is not therefore carried out.

Starting from phase 2, the critical braking conditions are encountered (test S249). The local measurements of the level of braking or deceleration (making it possible to determine iloc) thus enable a degradation of the runway to be detected. To be precise, during step S340, the actual or current level of braking F' is very much less than the level of braking or deceleration theoretically attainable in critical braking conditions iref=F (see FIG. 5c in phase 1). A degraded local runway state is thus obtained on finishing step S340.

The runway state EP or the stopping distance prediction D(EP) is then updated on the basis of the estimated local runway state EPloc or F', then applied in real-time or practically in real-time by the braking assistance system during a phase 2 to generate a new braking instruction or warning C(EP). For example, a braking monitoring device (ROP) adapts its warnings and a braking control device (BTV) commands a deceleration adapted to the conditions encountered, in order to avoid the risk of skidding. The stopping distance prediction is increased, this time corresponding to a SNOW runway state (see FIG. 5a).

However, during phase 2, the runway state degrades once again into an ICY type since the aircraft encounters a region with black ice.

Local measurements of the level of braking or deceleration (making it possible to determine iloc) enable that degradation of the runway to be detected (EPloc from SNOW to ICY), in particular because the aircraft is still confronted with critical braking conditions. The actual level of braking or deceleration F' is much less than the theoretically attainable level of braking or deceleration F obtained based on the reference information item iref updated previously (see FIG. 5c at the end of phase 2).

The runway state EP or the stopping distance prediction D(EP) is then updated on the basis of the new estimated local runway state EPloc or F', then applied in real-time or practically in real-time by the braking assistance system during a phase 3 to generate a new braking instruction or warning C(EP). Similarly, the corresponding stopping distance prediction D(EP) is increased (see FIG. 5a).

Local measurements next make it possible to note a new change in runway state, the latter this time inducing an improvement in the runway conditions (see FIG. 5c, phase 4). This time, the runway state EP or the stopping distance prediction D(EP), and thus the braking instruction are not updated, and are kept (phase 4) as in phase 3.

The preceding examples are only embodiments of the invention which is not limited thereto.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A method for assisting the piloting of an aircraft in landing phase, comprising the steps of:
   generating a braking data item on the basis of a reference runway state, said braking data item being supplied as an input for a braking assistance module adapted to generate a braking instruction to control a braking device of the same aircraft in the landing phase;
   determining, by the same aircraft, a local information item representing a current level of braking or deceleration of the same aircraft, which is dependent on a local runway state characterizing the runway zone upon which the same aircraft is moving on the ground during the landing phase;
   and when the local information item indicates a local runway state that is more degraded than the reference runway state:
   updating the reference runway state or the braking data item on the basis of the determined local information item, and providing an updated braking data as input for the braking assistance module to generate a new braking instruction controlling the braking device of the same aircraft.

2. The method according to claim 1, wherein the local information item is an estimation of the local runway state by an on-board system in the same aircraft, and the updating step updates the reference runway state with the estimated local runway state.

3. The method according to claim 2, wherein the updating step is carried out when at least one of the following critical conditions is encountered:
   the difference between a commanded value of deceleration of the same aircraft and a value of deceleration measured by the same aircraft exceeds a predetermined threshold;
   the level of manual depression of a brake pedal by an operator exceeds a predetermined threshold; and
   the difference between a level of braking commanded by the same aircraft and a level of braking measured in the same aircraft exceeds a predetermined threshold, an anti-skid system of the same aircraft is triggered.

4. The method according to claim 1, wherein the local information item represents a current level of braking or deceleration of the same aircraft, and the method includes a step of obtaining an information item, referred to as reference information item, representing a level of braking or deceleration of the same aircraft deduced from the reference runway state or from the braking data item and a step of comparing the reference information item with the local information item to determine whether the local runway state is more degraded than the reference runway state.

5. The method according to claim 4, wherein the updating step includes computing a correction coefficient dependent on the determined local information item and the braking data item correction on the basis of the computed correction coefficient.

6. The method according to claim 1, wherein the braking data item is a minimum stopping distance dependent on the reference runway state, and the updating step includes correcting the minimum stopping distance based on the determined local information item, by interpolating several minimum stopping distances respectively associated with theoretical runway states.

7. The method according to claim 6, wherein the determined local information item represents a current level of braking or deceleration of the same aircraft, and correcting the minimum stopping distance based on the determined local information item includes interpolating minimum stopping distances associated with theoretical deceleration or braking distances on the basis of the current determined level of braking or deceleration.

8. An assistance system for piloting an aircraft in a landing phase, comprising:
   a generating module for generating a braking data item on the basis of a reference runway state;
   a braking assistance module receiving said generated braking data item as input, and being adapted to generate a braking instruction to control a braking device of the same aircraft in the landing phase;
   a determining module for determining a local information item which represents a current level of braking or deceleration of the same aircraft, and is dependent on a local runway state characterizing the runway zone upon which the same aircraft is moving on the ground during the landing phase; and
   an updating module for updating the reference runway state or the braking data item on the basis of the determined local information item, when the local information item indicates a local runway state that is more degraded than the reference runway state, and for providing an updated braking data item as input for the braking assistance module, to generate a new braking instruction controlling the braking device of the same aircraft.

9. The system according to claim 8, wherein the local information item is an estimation of the local runway state, and the updating module is configured to update the reference runway state with the estimated local runway state.

10. The system according to claim 8, wherein the local information item represents a current level of braking or deceleration of the same aircraft, and the system includes an information module for obtaining an information item, referred to as reference information item, representing a level of braking or deceleration of the same aircraft deduced from the reference runway state or from the braking data item, and a comparator for comparing the reference information item with the local information item to determine whether the local runway state is more degraded than the reference runway state.

11. The system according to claim 10, further comprising a determining module for determining whether at least one of the following critical conditions is encountered in order to trigger updating by the updating module:
   the difference between a deceleration set-point value of the same aircraft to apply and a value of deceleration measured by the same aircraft exceeds a predetermined threshold;
   the level of manual depression of a brake pedal by an operator exceeds a predetermined threshold; and
   the difference between a commanded level of braking of the same aircraft and a level of braking measured in the same aircraft exceeds a predetermined threshold, an anti-skid system of the same aircraft is triggered.

12. An aircraft comprising at least one assistance system for piloting assistance system in a landing phase, the assistance system comprising:
   a generating module for generating a braking data item on the basis of a reference runway state;
   a braking assistance module receiving said generated braking data item as input, and being adapted to generate a braking instruction to control a braking device of the same aircraft in the landing phase;
   a determining module for determining a local information item which represents a current level of braking or deceleration of the same aircraft, and is dependent on a local runway state characterizing the runway zone upon which the same aircraft is moving on the ground during the landing phase; and
   an updating module for updating the reference runway state or the braking data item on the basis of the determined local information item, when the local information item indicates a local runway state that is more degraded than the reference runway state, for providing an updated braking data item as input for the braking assistance module, to generate a new braking instruction controlling the braking device of the same aircraft.

* * * * *